United States Patent
Fritsch

[15] 3,661,332
[45] May 9, 1972

[54] APPARATUS FOR GRANULATING SYNTHETIC MATERIAL

[72] Inventor: Rudolf Paul Fritsch, Stuttgart-Weilimdorf, Germany

[73] Assignee: C. F. Scheer & Cie, Stuttgart-Feuerbach, Germany

[22] Filed: Mar. 27, 1970

[21] Appl. No.: 23,329

[30] Foreign Application Priority Data

Mar. 29, 1969 Germany .................... P 19 16 219.7

[52] U.S. Cl. ............................................. 241/222, 241/301
[51] Int. Cl. ....................................................... B02c 18/06
[58] Field of Search ...................... 241/222, 223, 280, 301; 83/479

[56] References Cited

UNITED STATES PATENTS

| 817,382 | 4/1906 | Merrill | 241/223 |
| 2,559,701 | 7/1951 | Becker | 241/222 |
| 1,959,424 | 5/1934 | Hawkins | 83/479 X |
| 3,408,886 | 11/1968 | David | 83/479 X |

Primary Examiner—Granville Y. Custer, Jr.
Attorney—Michael S. Striker

[57] ABSTRACT

First and second cutting means can be shifted together between a first position in which the first cutting means is located in a path along which ropes consisting of a synthetic material are fed, and a second position in which the second cutting means is located in the path, and cuts the transported ropes. The respective other cutting means is available for servicing, and it is preferred that only the operating cutting means be driven by a motor, while the respective other cutting means, which is idle, is disconnected by a clutch from the motor.

10 Claims, 2 Drawing Figures

Inventor:
RUDOLF PAUL FRITSCH
By: Michael S. Striker
Attorney

APPARATUS FOR GRANULATING SYNTHETIC MATERIAL

BACKGROUND OF THE INVENTION

The present invention relates to apparatus for granulating hard ropes or rods consisting of a synthetic plastic material.

At the present time, it is preferred to trade synthetic material in granulated form which has the advantage that it can be easily drawn into extrusion devices or preliminary plasticizing units of injection casting machines. Also, granulated synthetic material can be easily measured by volume, and transported by pressure or suction through tubes. Another advantage of granulated material is the possibility of packing and transporting the same in bags. Very fine granulated material is preferred since such material is particularly suited for being subjected to further treatment, and the particles may have a diameter of about 1 mm. Due to the very large amount of granulated material which is required, it is desirable to continuously cut ropes or rods of synthetic material into granules.

Known apparatus having this purpose are provided with a rotary cutting head toward which ropes of a synthetic material are fed after being extruded through nozzles and having passed through a water bath in which the ropes are cooled and hardened. Depending on the diameter of the ropes, rods, or filaments consisting of the synthetic material, and also depending on the feeding speed, and on the number of revolutions and spacing of the cutting knives of the cutting head, granules of large or small size are obtained.

Known granulating apparatus serving this purpose, has the disadvantage that the operation has to be interrupted when a new material of different color or type has to be cut in the apparatus, since it is necessary to clean the cutting head. Every stopping of the apparatus causes a noticeable reduction of the daily output, and thereby a lower efficiency. Other servicing operations required on the cutting head, also require stopping of the apparatus and interruption of the operation, even if the same material is treated.

SUMMARY OF THE INVENTION

It is one object of the invention to overcome the disadvantages of known granulating apparatus, and provide an apparatus in which synthetic material can be continuously cut and granulated without interruptions.

Another object of the invention is to provide in an apparatus for granulating synthetic material two cutting heads which are alternatively operative and inoperative so that at all times, a cutting head is available for granulating the continuously fed material.

Another object of the invention is to drive only the operating cutting head, while the inoperative cutting head is stopped.

With these objects in view, an apparatus according to the invention comprises two cutting means mounted on a carrier which is shiftable transverse to the path along which the ropes of the synthetic material are fed. When one of the cutting means has to be cleaned, or serviced in any other manner, the carrier is shifted with the two cutting means transversely to the feeding path of the synthetic ropes so that the other cutting means becomes operative and the operation can be continued without interruption.

The synthetic ropes are fed to one of the cutting means in a cooled and hardened condition.

In the preferred embodiment, the cutting means are driven independently of each other, for example by two electric motors. However, it is more economical, and therefore preferred, to provide a common motor mounted on the carrier of the cutting means, and driving the same, respectively, through two transmissions, each of which includes a clutch so that the inactive cutting means can be disconnected from the motor by disengagement of the respective clutch.

It is advantageous to provide transverse rails on which the carrier with the rotary cutting means can be moved transverse to the direction of the feeding path between a first position in which one of the cutting means is located in the feeding path, and a second position in which the other cutting means is located in the feeding path.

One embodiment of the invention comprises feeding means, preferably including rollers and belt loops for feeding at least one and preferably a plurality of ropes consisting of a synthetic material along a path; supporting means, preferably including transverse rails; carrier means mounted on the supporting means for movement transverse to the path between two positions; and first and second cutting means, preferably rotatable cutting heads, mounted on the carrier means for movement with the same between a first position in which the first cutting means located in the path of the ropes and a second position in which the second cutting means is located in the path of the ropes for granulating the same. In this manner the ropes can be continuously granulated by the first or second cutting means while the respective other second and first cutting means are available for servicing. Means are preferably provided for driving only the first cutting means in the first position, and only the second cutting means in the second cutting position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
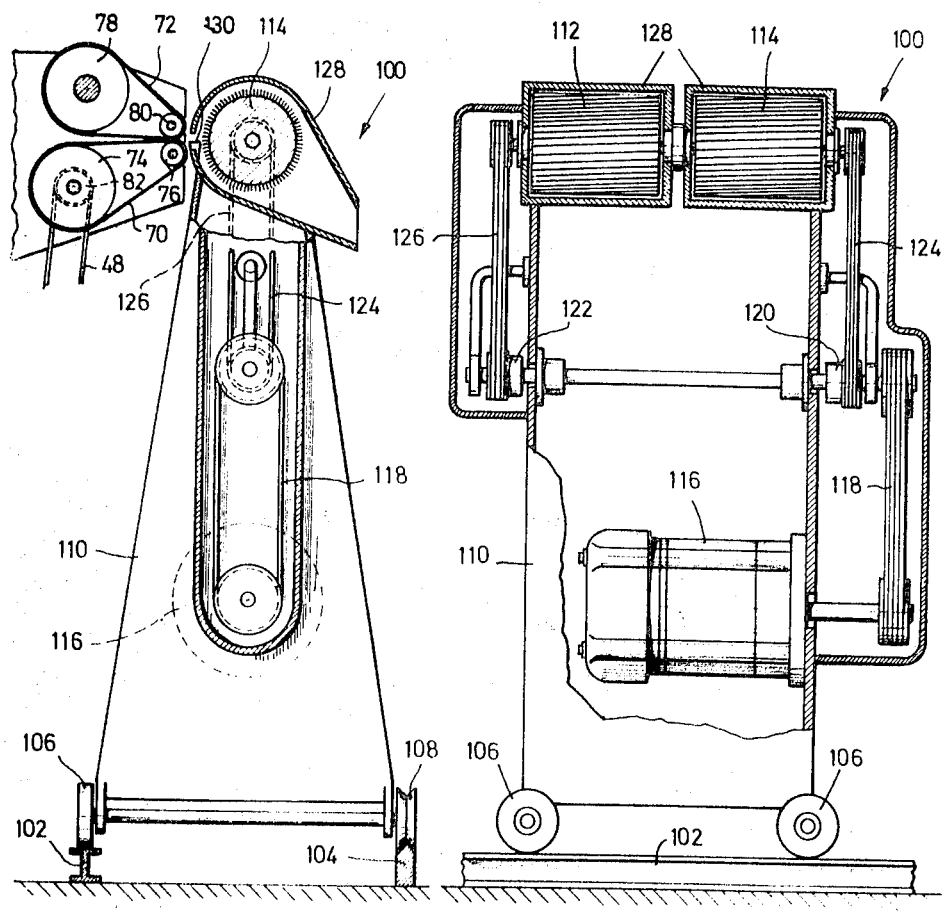
FIG. 1 is a fragmentary schematic side elevation, partially in vertical section, illustrating an apparatus according to one embodiment of the invention.
FIG. 2 is a fragmentary schematic front elevation, partially in vertical section and broken off, of the embodiment of FIG. 1.

A plurality of ropes consisting of a synthetic material are extruded from an extrusion nozzle head, not shown, and pass through a cooling bath, not shown, so that they are hardened and enter parallel to each other and located in a horizontal plane into the gap between two endless belt loops 70 and 72 which pass about larger rollers 74 and 78 and smaller rollers 76 and 80, roller 74 being driven by a gear pulley 82 and a corresponding belt 48 driven by a motor, not shown. The gap between the endless belt loops 72 and 70 narrows in the feeding direction so that a plurality of ropes are fed along a horizontal path into the inlet of a hood 128 which has an adjustable guide 130.

The endless belt loops 70 and 72 consist of an elastic material, and rollers 76 and 78 are pressed toward each other by biasing means, not shown, acting on the end portions of the shafts of rollers 76 and 80.

The hood 128 is part of a granulating apparatus 100, which includes a carrier means 110 having a pair of wheels 106 and 108 rolling on rails 102 and 104 of supporting means. Rails 102 and 104 extend transverse to the feeding direction, and are located in a horizontal plane so that inlet means 130 remains in the horizontal plane of the feeding path during displacement of carrier 110.

Two cutting means 112 and 114 in the form of rotary cylindrical cutting heads are mounted on carrier 110 for rotation independently of each other about a common axis. The drive means of the cutting means 112 and 114 include a common electric motor 116, also mounted on carrier 110, and driving through a pulley belt transmission 118 a shaft provided with clutch means 120 and 122 which respectively drive, when engaged, the shafts of the cutting means 114 and 112 through pulley and belt transmissions 124 and 126.

Only one clutch means is placed in the engaged position at any time so that the respective cutting means is rotated, while the other clutch is disengaged, and the respective cutting means is not rotated. Clutches 120 and 122 may be manually operated, but it is also possible to use electromagnetic clutches, and to selectively energize the same by conventional switches.

Assuming that one of the cutting means, for example cutting means 114 is operative, then carrier 110 is in a position in which the endless feeding loop belt 72, and 70 feed ropes to cutting means 114, the series of ropes, not shown, being fed along a path having the same width as cutting means 114 toward the knives of cutting means 114 in a horizontal plane passing through the axis of the same so that the ropes are cut and granulated by cutting means 114. At the same time, the clutch 122 is disengaged, and cutting means 112 is not rotated. Cutting means 112 is also located adjacent the path of the fed ropes of synthetic material so that no ropes are engaged by the cutting means 112. In this inactive condition cutting means 112 can be cleaned, or otherwise serviced. When it is necessary to clean or service the active cutting means 114, carrier 110 is shifted on rails 102 to a position in which the cutting means 114 is located laterally of the feeding path of the ropes, which are now fed to cutting means 112 only and granulated by the same when clutch 122 is engaged. At the same time, clutch 120 is disengaged so that the inactive cutting means 114 is not rotated.

By alternatively shifting the carrier 110 with the cutting means 112 and 114 transverse to the feeding direction and to the feeding path between two positions, it is possible to continuously granulate a continuously fed series of ropes consisting of a synthetic material, although all necessary servicing operations can be performed.

It will be understood that each of the elements described above, or two or more together, may also find a useful application in other types of cutting apparatus for granulating material, differing from the types described above.

While the invention has been utilized and described as embodied in an apparatus including first and second cutting means for alternately granulating a synthetic material, it is not intended to be limited to the details shown, since various modifications and structural changes may be made without departing in any way from the spirit of the present invention.

Without further analysis, the foregoing will co fully reveal the gist of the present invention that others can by applying current knowledge readily adapt it for various applications without omitting features from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended claims.

I claim:

1. In combination with feeding means for feeding at least one rope means in a feeding direction in a working plane along a path having a predetermined width; a granulating apparatus comprising supporting means; carrier means mounted on said supporting means for movement in a direction transverse to said feeding direction for a distance greater than said predetermined width between two positions; and first and second cutting means aligned in said transverse direction and located in said working plane, said first and second cutting means being mounted on said carrier means for movement in said working plane in said transverse direction equidistant from said feeding means between a first position in which said first cutting means is located in said path for granulating the rope and said second cutting means is located outside of said path, and a second position in which said second cutting means is located in said path and said first cutting means is located outside of said path so that the rope means can be continuously granulated by one of said cutting means while the respective other cutting means is available for servicing.

2. Apparatus as claimed in claim 1 comprising means for driving only said first cutting means in said first position, and only said second cutting means in said second position.

3. Apparatus as claimed in claim 2 wherein said driving means include a motor, first clutch means connecting said motor with said first cutting means and second clutch means for connecting said motor with said second cutting means, said first and second clutch means being selectively engageable so that said first clutch means is engaged and said second clutch means is disengaged in said first position, and said first clutch means is disengaged and said second clutch means is engaged in said second position.

4. Apparatus as claimed in claim 1 wherein said first and second cutting means are rotary cutting heads; and comprising first and second transmission means respectively including first and second clutch means, and motor means connected by said first and second transmission means with said first and second cutting heads, respectively; and means for selectively operating said first and second clutch means so that the cutting head located in said path is driven, and the respective other cutting head is not driven.

5. Apparatus as claimed in claim 1 wherein said supporting means include rail means extending in said transverse direction to said path; and wherein said carrier means is mounted on said rail means for said transverse movement with said first and second cutting means.

6. Apparatus as claimed in claim 1 wherein said feeding means transport a plurality of ropes in horizontal direction along said path so that said path has said predetermined width; and wherein each of said first and second cutting means has a predetermined width in said transverse direction corresponding to the width of said path.

7. Apparatus as claimed in claim 1 comprising a hood enveloping each of said first and second cutting means and having an inlet opening located in said working plane extending in said transverse direction along said first and second cutting means, respectively, for guiding the rope means to said first and second cutting positions, respectively, said hoods having downward directed outlet portions for discharging material granulated by one of said first and second cutting means.

8. Apparatus as claimed in claim 7, wherein the confronting inner ends of said first and second aligned cutting means are spaced from each other in said transverse direction; and comprising first and second drive means acting on the outer ends of said first and second cutting means so that the space between said confronting inner ends of said first and second cutting means and of said hoods remains free for non-granulated ropes.

9. Apparatus as claimed in claim 1 wherein said first and second cutting means are rotatably mounted on said carrier means for independent rotation about a common axis located in said path, and comprising drive means including first and second transmission means mounted on said carrier means, and motor means mounted on said carrier means and being connected by said first and second transmission means with the outer ends of said first and second rotary cutting means, respectively; and wherein said drive means are operable for selectively driving either said first cutting means or said second cutting means.

10. Apparatus as claimed in claim 9 wherein each of said first and second transmissions includes a clutch movable between engaged and disengaged positions.

* * * * *